(12) United States Patent
Li (10) Patent No.: US 10,812,433 B2
(45) Date of Patent: Oct. 20, 2020

(54) DYNAMIC MESSAGE DISPLAYING

(71) Applicant: Lenovo (Beijing) Co., Ltd., Beijing (CN)

(72) Inventor: Zhigang Li, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 109 days.

(21) Appl. No.: 15/793,685

(22) Filed: Oct. 25, 2017

(65) Prior Publication Data

US 2018/0287983 A1 Oct. 4, 2018

(30) Foreign Application Priority Data

Mar. 28, 2017 (CN) .......................... 2017 1 0191977

(51) Int. Cl.
*H04L 12/58* (2006.01)
*G06F 3/048* (2013.01)
*G06F 3/0481* (2013.01)

(52) U.S. Cl.
CPC .............. *H04L 51/16* (2013.01); *G06F 3/048* (2013.01); *G06F 3/0481* (2013.01); *H04L 51/046* (2013.01); *H04L 51/24* (2013.01); *H04L 51/10* (2013.01)

(58) Field of Classification Search
CPC ....... H04L 51/16; H04L 51/24; H04L 51/046; H04L 51/10; G06F 3/048; G06F 3/0481
See application file for complete search history.

(56) References Cited

U.S. PATENT DOCUMENTS

| | | | | |
|---|---|---|---|---|
| 9,154,606 | B2* | 10/2015 | Tseng ................ | H04M 1/72552 |
| 2009/0249247 | A1* | 10/2009 | Tseng ...................... | H04W 4/12 |
| | | | | 715/808 |
| 2014/0089406 | A1* | 3/2014 | Gniffke ................. | H04L 67/147 |
| | | | | 709/204 |
| 2014/0136993 | A1* | 5/2014 | Luu .......................... | G06F 3/048 |
| | | | | 715/753 |
| 2014/0208336 | A1* | 7/2014 | Shia ........................ | G06F 9/542 |
| | | | | 719/318 |
| 2014/0330881 | A1* | 11/2014 | Stone ...................... | H04W 4/60 |
| | | | | 709/201 |
| 2014/0359479 | A1* | 12/2014 | Kamdar ............. | G06Q 30/0241 |
| | | | | 715/752 |
| 2015/0019966 | A1* | 1/2015 | Jeon ........................ | H04L 51/24 |
| | | | | 715/716 |
| 2015/0169159 | A1* | 6/2015 | Yang ................... | G06F 3/04817 |
| | | | | 715/808 |
| 2015/0264309 | A1* | 9/2015 | Chastney ........... | H04N 21/4788 |
| | | | | 715/719 |

(Continued)

FOREIGN PATENT DOCUMENTS

| CN | 103841441 A | 6/2014 |
|---|---|---|
| CN | 105677167 A | 6/2016 |
| CN | 106528120 A | 3/2017 |

*Primary Examiner* — James R Sheleheda
(74) *Attorney, Agent, or Firm* — Anova Law Group, PLLC (57) ABSTRACT

A method includes obtaining, by a first program of an electronic device, a notification associated with a dynamic message of a second program of the electronic device, and, in response to detecting that a message display interface of the first program is switched from an inactive status to an active status, displaying the dynamic message on the message display interface.

16 Claims, 6 Drawing Sheets

(56) References Cited

U.S. PATENT DOCUMENTS

| | | | |
|---|---|---|---|
| 2016/0066187 A1* | 3/2016 | Wynn | H04W 12/08 |
| | | | 726/7 |
| 2016/0359782 A1* | 12/2016 | Son | H04L 51/12 |
| 2017/0344226 A1* | 11/2017 | Gudla | H04W 12/06 |
| 2018/0082340 A1* | 3/2018 | Freund | G06Q 30/0277 |
| 2018/0285148 A1* | 10/2018 | Dutton | H04L 67/02 |
| 2018/0287983 A1* | 10/2018 | Li | H04L 51/16 |
| 2019/0075199 A1* | 3/2019 | Tseng | H04M 1/72552 |
| 2019/0182176 A1* | 6/2019 | Niewczas | H04L 67/306 |

* cited by examiner

DYNAMIC MESSAGE DISPLAYING

CROSS-REFERENCE TO RELATED APPLICATION

This application claims priority to Chinese Patent Application No. 201710191977.X, filed on Mar. 28, 2017, the entire contents of which are incorporated herein by reference.

TECHNICAL FIELD

The present disclosure generally relates to the field of display control and, more particularly, to a method for displaying dynamic messages and an electronic device.

BACKGROUND

Users can receive and send dynamic messages or messages in other forms based on network technologies. However, in conventional smart terminal devices, dynamic messages cannot be directly displayed in a message display region, e.g., a notification bar. If a user needs to view and display received dynamic messages, the user usually visits a certain directory at a different level to search relevant information, and click to play and view. Thus, the operation is inconvenient and user experience is poor.

SUMMARY

In one aspect, the present disclosure provides a method. The method includes obtaining, by a first program of an electronic device, a notification associated with a dynamic message of a second program of the electronic device, and, in response to detecting that a message display interface of the first program is switched from an inactive status to an active status, displaying the dynamic message on the message display interface.

Another aspect of the present disclosure provides an electronic device. The electronic device includes a processor managing a first program and a second program. The processor receives a notification associated with a dynamic message from the second program and, in response to detecting that a message display interface of the first program is switched from an inactive status to an active status, displays the dynamic message on the message display interface.

BRIEF DESCRIPTION OF THE FIGURES

The following drawings are merely examples for illustrative purposes according to various disclosed embodiments and are not intended to limit the scope of the present disclosure.

DETAILED DESCRIPTION

Embodiments of the disclosure will now be described in more detail with reference to the drawings. It is to be noted that, the following descriptions of some embodiments are presented herein for purposes of illustration and description only, and are not intended to be exhaustive or to limit the scope of the present disclosure.

The aspects and features of the present disclosure can be understood by those skilled in the art through the embodiments of the present disclosure further described in detail with reference to the accompanying drawings.

The present disclosure provides a display method for a dynamic message. In the display method, when a message display interface is switched to the active status, the corresponding dynamic message can be displayed on the message display interface, without a need to visit a preset directory to search for the corresponding message, thereby simplifying the operation.

Figure 1:
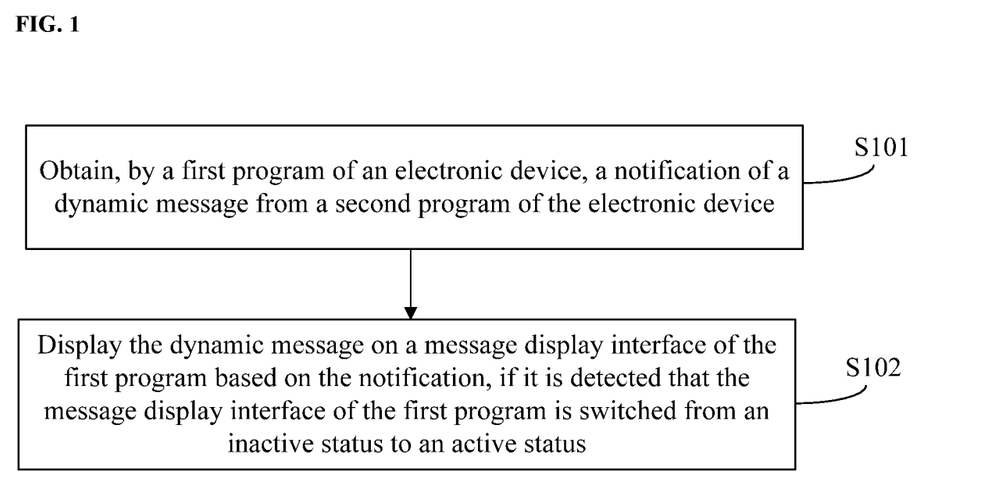
FIG. 1 illustrates a flow chart of an example of display method for a dynamic message according to various disclosed embodiments of the present disclosure.

FIG. 1 illustrates a flow chart of an example of display method for a dynamic message consistent with the present disclosure. The display method can be implemented in, for example, an electronic device. The electronic device can be any electronic device having a display interface, e.g., a computer, a mobile phone, a handheld terminal, or a smart terminal.

With reference to FIG. 1, the display method for the dynamic message is described below.

At S101, a first program, e.g., a first application program, of the electronic device obtains a notification of a dynamic message from a second program, e.g., a second application program, of the electronic device. The first program may be used to display a notification-type message.

At S102, the dynamic message is displayed on a message display interface of the first program based on the notification, if it is detected that the message display interface of the first program is switched from an inactive status to an active status.

In some embodiments, the electronic device may include at least the first program, e.g., the first application program, and the second program, e.g., the second application program. The first program and the second program both may be application programs installed on the electronic device. The first program may control the message display interface, e.g., displaying various types of messages on the message display interface. In some other embodiments, the first program may also adjust a display style, an active status, etc., of the message display interface. The second program may request to obtain or receive the dynamic message and generate the notification of the dynamic message. Further, in some embodiments, the dynamic message may include, for example, a dynamic image, dynamic text, a dynamic video, or another message that is displayed in a dynamic manner.

In some embodiments, the dynamic message may be loaded through the second program or an address of the dynamic message may be obtained through the second program. Further, through the second program, a notification of the dynamic message may be generated and may be sent to the first program. After receiving the notification, the first program may load the dynamic message to the message display interface and display the dynamic message on the message display interface when the message display interface is at the active status. The second program may obtain dynamic-message information, i.e., information related to the dynamic message, by requesting the dynamic message from a server or another electronic device or by receiving the dynamic message pushed from a server or another electronic device.

When requesting the dynamic message, a process of obtaining the dynamic-message information may include, for example, sending a request including at least one of a keyword, a subject, or a message type of the dynamic message, and receiving return information including the dynamic message.

As described above, the second program may obtain the dynamic-message information by receiving the pushed dynamic message. The dynamic-message information may be received according to a preset condition. The preset condition may include, for example, at least one of a type, a subject, a duration, or a keyword of the dynamic message.

Obtaining the dynamic-message information may include obtaining a web page link or a storage address of the dynamic message, or may include receiving a complete content of the dynamic message directly from a server or another electronic device. Different notifications may be generated according to different dynamic-message information. That is, the above-mentioned notification of the dynamic message obtained by the second program may include, for example, a web page link or a storage address of the dynamic message. The storage address may include, for example, a network storage address such as a cloud address or a local directory address of the electronic device.

In some embodiments, after obtaining the notification, the first program of the electronic device may locate the dynamic message according to the notification. If the notification includes a web page link or a network storage address for the dynamic message, the first application may load the dynamic message, and further display the dynamic message when the message display interface is at the active status. If the second program has obtained the dynamic message from a server or anther electronic device, the first program may locate the dynamic message directly according to a local storage address of the dynamic message provided in the notification, and may display the dynamic message when the message display interface is at the active status. In the present disclosure, a dynamic message can be viewed by switching the message display interface to the active status, without a need to manually find a message or other file in a certain file directory. Further, the dynamic message can be directly loaded and then displayed on the message display interface. That is, when the message display interface is at the active status and the first program or the second program has cached the dynamic message, the dynamic message can be displayed on the message display interface of the first program, without a need to download the dynamic message while viewing the dynamic message, thereby improving a viewing experience.

In addition, although some embodiments of the present disclosure are described for scenarios that the message display interface displays a dynamic message as examples, in the present disclosure, the message display interface can also display a static message, e.g., text, an image, etc., which is not restricted in the present disclosure.

Figure 2:
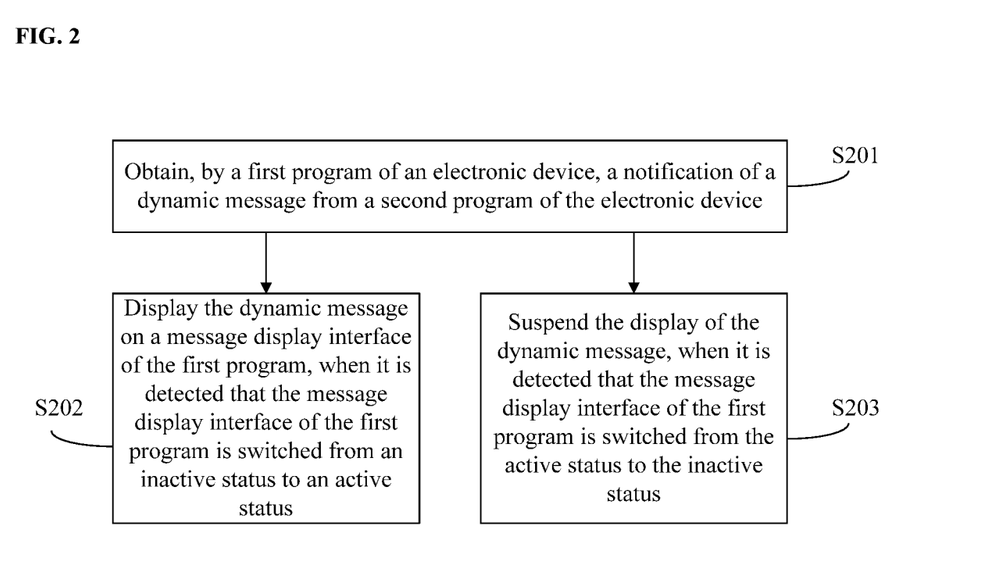
FIG. 2 illustrates a flow chart of an example of display method for a dynamic message according to various disclosed embodiments of the present disclosure.

FIG. 2 illustrates a flow chart of another example of display method for a dynamic message consistent with the disclosure. As shown in FIG. 2, at S201, a first program of an electronic device obtains a notification of a dynamic message from a second program of the electronic device. The first program may be configured to display a notification-type message.

At S202, the dynamic message is displayed on a message display interface of the first program, when it is detected, e.g., determined, that the message display interface of the first program is switched from an inactive status to an active status.

At S203, the display of the dynamic message is suspended, when it is detected that the message display interface of the first program is switched from the active status to the inactive status.

As compared to the method shown in FIG. 1, the method shown in FIG. 2 further includes suspending the display of the dynamic message, when it is detected that the message display interface of the first program is switched from the active status to the inactive status. That is, in the method shown in FIG. 2, the display of the dynamic message is suspended, when the message display interface is switched to the inactive status or after the message display interface is switched to the inactive status for a preset duration, i.e., a preset time duration.

In some embodiments, when it is detected that the message display interface of the first program is switched from the active status to the inactive status, the display of the dynamic message may be suspended, and a playing progress of the dynamic message may be obtained and stored. Further, the dynamic message may be displayed again according to the stored playing progress, when it is detected that the message display interface is switched from the inactive status back to the active status.

That is, in some embodiments, the display of the dynamic message can be suspended, when the message display interface is switched from the active status to the inactive status. Further, the display of the dynamic message can be continued, e.g., resumed, according to the playing progress stored at the time of suspending the display, when the message display interface is switched back to the active status. Accordingly, a user experience can be improved.

In addition, in some embodiments, a display region can be assigned within the message display interface for the dynamic message to be displayed, before the dynamic message is loaded and then displayed on, such that the dynamic message can be loaded and displayed on the assigned display region. When the message display interface exposes a current display region for the dynamic message, the display of the dynamic message may be executed. The display of the dynamic message may be suspended, when the display region for the dynamic message is switched from the active status to the inactive status. When the display region is returned to the active status, the display of the dynamic message may be continued according to the playing progress at the time of suspending the dynamic message.

Switching between the active status and the inactive status of the message display interface may be performed based on a preset instruction. For example, the preset instruction for switching the message display interface to the active status or the inactive status can be generated according to, e.g., a preset action, a preset voice, or a preset touch object such as an icon. The preset action may include, for example, a pre-stored gesture action, such as sliding down from a top of a display screen of the electronic device, sliding toward an opposing side from one side of the display screen of the electronic device, or sliding up from a bottom of the display screen of the electronic device. The preset voice may include, for example, a pre-stored voice that has been configured in advance. The pre-stored voice not only can include a voice content, but also can include a voice print of the user who generated the voice. When the voice content and the voice print are both matched, the status of the message display interface may be switched. Further, the preset touch object may include, for example, a preset shortcut key, a corresponding touch key, or the like.

In addition, switching between the active status and the inactive status of the display region assigned in the message display interface and assigned for the dynamic message can be performed similarly according to the above-described preset instruction. Different preset instructions can be configured to switch the message display interface to the active status or to the inactive status, respectively. Further, different preset instructions can be configured to switch the display region assigned in the message display interface to the active status or to the inactive status, respectively.

Further, in some embodiments, a sliding operation may be performed on the message display interface. In some embodiments, when the sliding operation is performed, a display region of the message display interface that is displayed on the display screen of the electronic device may be at the active status, and a display region of the message display interface that is not displayed on the display screen of the electronic device may be at the inactive status. In some other embodiments, it may be determined that a display region of the message display interface that is currently in a center portion of the display screen is at the active status, and a display region of the message display that is currently not in the center portion of the display screen is at the inactive status.

In the present disclosure, a message display on the message display interface may be controlled, and the display of the dynamic message can be adjusted according to a real-time user operation, thereby improving a user experience.

Figure 3:
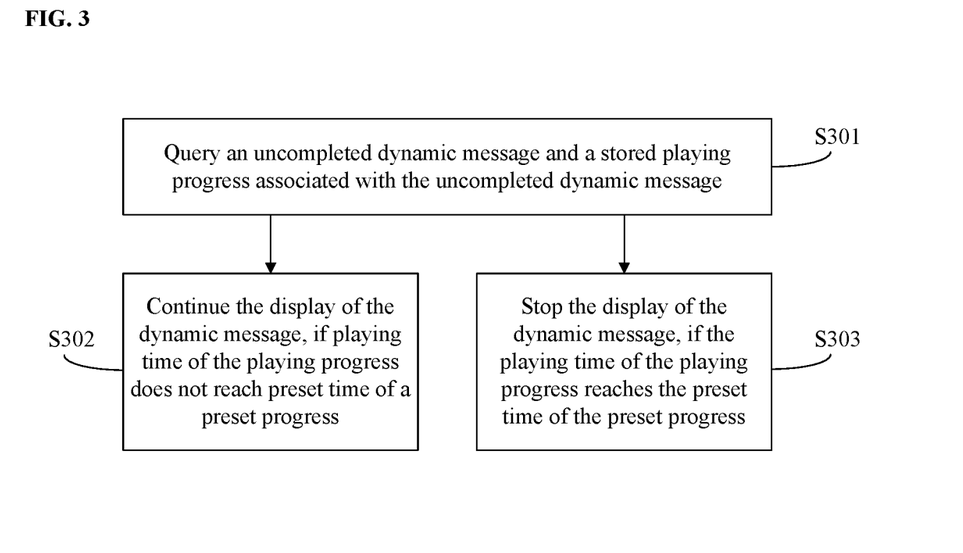
FIG. 3 illustrates a flow chart of displaying a dynamic message based on a stored playing progress according to various disclosed embodiments of the present disclosure.

FIG. 3 illustrates a flow chart of displaying a dynamic message based on a stored playing progress consistent with the disclosure. As shown in FIG. 3, at S301, an uncompleted dynamic message, i.e., a dynamic message that has not been completely played, and a stored playing progress associated with the uncompleted dynamic message are queried.

At S302, the display of the dynamic message is continued, if playing time of the playing progress does not reach preset time of a preset progress.

At S303, the display of the dynamic message is stopped, if the playing time of the playing progress reaches the preset time of the preset progress.

That is, in some embodiments, whether to continue playing the dynamic message may be chosen according to the playing progress at the time when the play, i.e., the display, of the dynamic message is suspended. The playing progress may include, for example, a percentage of played time or current playing time with respect to a total time duration of the dynamic message. When the message display interface is switched back to the active status, the playing progress and the preset progress may be compared to each other, and whether to continue displaying the dynamic message may be chosen according to a comparison result.

The first program or the second program may assign a preset progress for a duration, i.e., a time duration, of the dynamic message, when playing time is used for representing a playing progress and preset time is used for representing a preset progress during the comparison. Because a duration of one dynamic message may be different from a duration of another dynamic message, the individually assigned preset progress for each dynamic message can be more suitable for the dynamic message. Accordingly, for a dynamic message having a relatively long duration, when the message display interface is displayed again, stopping the play of the dynamic message when a large portion has not been played may be prevented. Further, for a dynamic message having a relatively short duration, when the message display interface is displayed again, continuing the play when the play of the dynamic message has been finished may be prevented.

In some embodiments, when the playing time of the playing progress of the dynamic message at the time of pausing does not reach the preset time of the preset progress, the display of the dynamic message may be continued. When the playing time of the playing progress of the dynamic message at the time of pause reaches the preset time of the preset progress, the display of the dynamic message may be stopped. In addition, the preset progress may be configured, such that a ratio of the preset time of the preset progress to a total duration of the dynamic message may range from approximately 85% to approximately 95%. The preset time of the preset progress may refer to a preset duration of the preset progress. The ratio of the preset time of the preset progress to a total duration of the dynamic message may refer to a duration ratio of the preset duration of the preset progress to the total duration of the dynamic message, i.e., a preset duration ratio for the preset progress.

In some embodiments, the preset progress may be represented by the percentage of the preset time, i.e., the percentage of the preset duration, to the total duration of the dynamic message, and a duration ratio representing a current playing progress may be directly obtained at the time of pausing. The duration ratio may be compared with the preset progress. If the duration ratio of the playing progress at the time of pausing does not reach the preset duration ratio of the preset progress, i.e., the percentage of the preset duration, the display of the dynamic message may be continued. If the duration ratio of the playing progress at the time of pausing reaches the preset duration ratio of the preset progress, the display of the dynamic message may be stopped.

Figure 4:
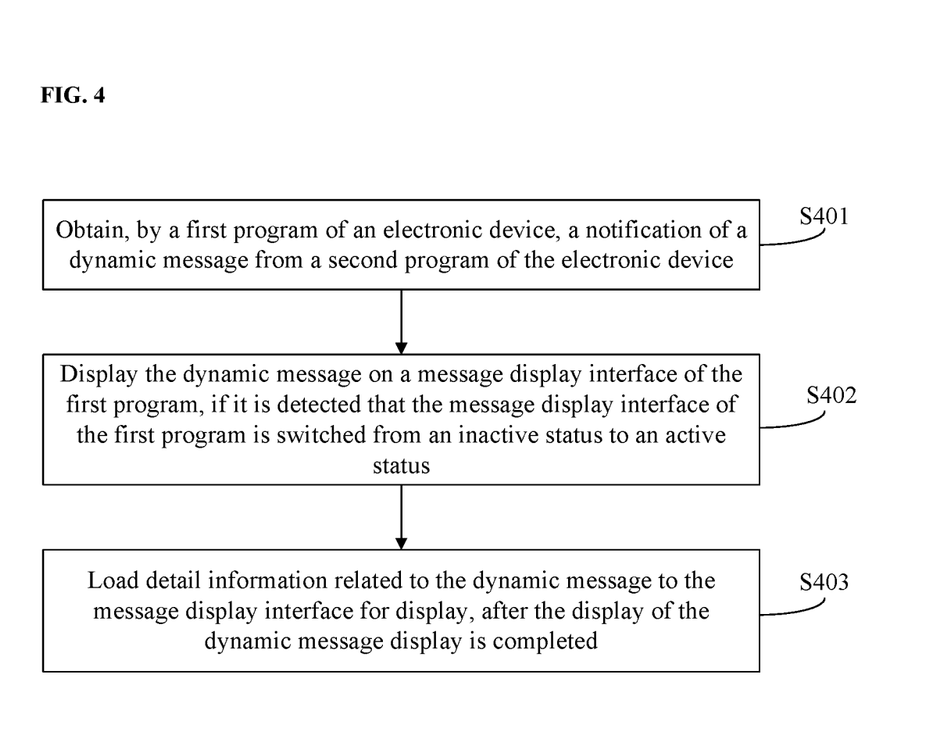
FIG. 4 illustrates a flow chart of another example of display method for a dynamic message according to various disclosed embodiments of the present disclosure.

FIG. 4 illustrates a flow chart of another example of display method for a dynamic message consistent with the disclosure. As shown in FIG. 4, at S401, a first program, e.g., a first application program, of an electronic device obtains a notification of a dynamic message from a second program, e.g., a second application program, of the electronic device.

At S402, the dynamic message is displayed on a message display interface of the first program, if it is detected that the message display interface of the first program is switched from an inactive status to an active status.

At S403, detail information related to the dynamic message is loaded to the message display interface for display, after the display of the dynamic message display is completed.

As compared to the methods shown in FIG. 1 and FIG. 2, the method shown in FIG. 4 further includes loading the detail information related to the dynamic message, also referred to as "dynamic-message detail information," to the message display interface for display, after the display of the dynamic message display is completed.

In some embodiments, the first program or the second program may analyze details of the dynamic message, when obtaining the dynamic message. In some other embodiments, a server may directly provide the details of the dynamic message when sending the dynamic-message information. The dynamic-message detail information may include, for example, a web page link, a duration, a capacity size, and producer information of the dynamic message. After the display of the dynamic message is completed on the message display interface, the first program may load the dynamic-message detail information to a display region assigned to display the dynamic message, such that the user can obtain the detail information of the dynamic message.

Figure 5:
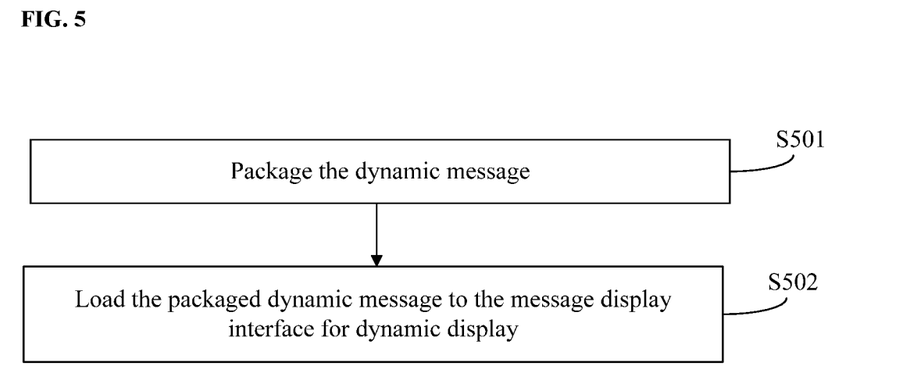
FIG. 5 illustrates a flow chart of preprocessing on a dynamic message according to various disclosed embodiments of the present disclosure.

In some embodiments, the display method may further include preprocessing the dynamic message before displaying the dynamic message on the message display interface of the first program of the electronic device. FIG. 5 illustrates a flow chart of preprocessing a dynamic message consistent with the disclosure. As shown in FIG. 5, at S501, the dynamic message is packaged.

At S502, the packaged dynamic message is loaded to the message display interface for dynamic display.

The packaging operation may at least include, for example, packaging a touch interaction object with the dynamic message. The touch interaction object may include, for example, a touch key, a play/pause button, a close button, a total duration, a display bar of a current playing progress, etc.

In some embodiments, at least one of the first program or the second program can preprocess the dynamic message. When the dynamic-message detail information is obtained, the dynamic message can be packaged based on the dynamic-message detail information, for facilitating the user's operation and control of the dynamic message.

In addition, the current playing progress may be separately packaged. That is, when the current playing progress is displayed, the duration of the dynamic message can be obtained, and the duration and the current playing progress may be packaged in the dynamic message that is displayed.

In the disclosed display method for the dynamic message, a dynamic message may be loaded to a message display interface and displayed on the message display interface. Accordingly, the user can find and view the dynamic message to be displayed by entering the message display interface, without a need to access a certain directory to find the dynamic message. The operation may be simplified, and a convenient viewing may be provided, and a user experience may be improved.

The present disclosure also provides an electronic device. The electronic device may realize a display of a dynamic message on a message display interface by using the above-described disclosed display method for a dynamic message.

Figure 6:
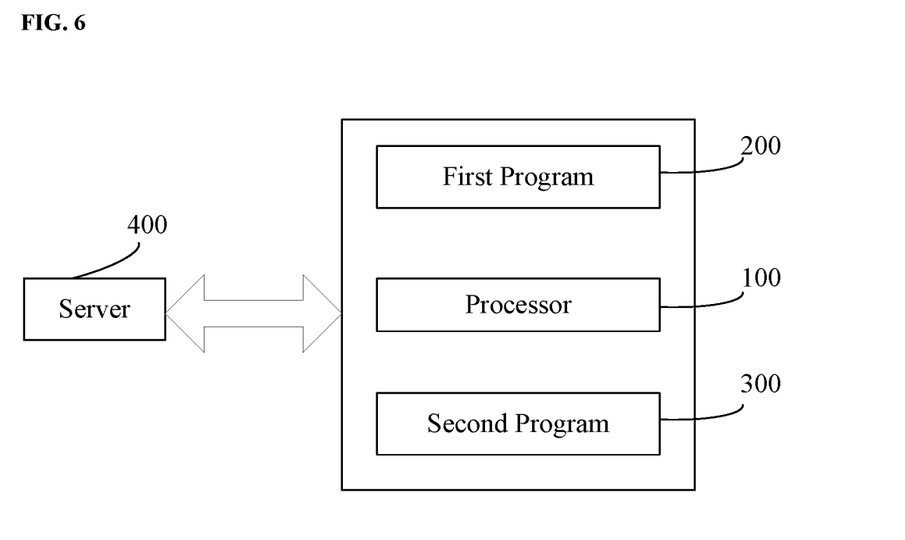
FIG. 6 illustrates a block diagram of an example of electronic device according to various disclosed embodiments of the present disclosure.

FIG. 6 illustrates a block diagram of an example of electronic device consistent with the disclosure. As shown in FIG. 6, the electronic device at least includes a processor 100 and a plurality of programs including a first program 200 and a second program 300.

The processor 100 may be configured to manage various programs or process data transmitted between various programs. For example, the second program 300 may obtain information about a dynamic message, i.e., dynamic-message information, and a message display interface of the first program 200 may be configured to display various messages including the dynamic message obtained by the second program 300.

In some embodiments, the processor 100 may be configured to control a display of the dynamic message or another message on the message display interface of the first program 200. In some embodiments, the second program 300 may obtain the above-described dynamic-message information. In some other embodiments, the second program 300 may perform packaging, editing, and/or another operation on the dynamic message. The first and second programs are programs running on the electronic device. The first and second programs each may be configured to include, for example, a separate program, i.e., a separate APP.

In some embodiments, the second program 300 may obtain dynamic-message information from a server 400 or another electronic device, and may generate a notification about the dynamic message. The processor 100 may locate the dynamic message when receiving the notification about the dynamic message. Further, the processor 100 may control a display of the located dynamic message on the message display interface, when determining that the message display interface of the first program 200 is switched from the inactive status to the active status.

In some embodiments, the second application 300 may automatically download and obtain the dynamic message, or may obtain a storage address or a network link of the dynamic message. In some other embodiments, the second application 300 may perform the downloading according to control instructions of the processor 100 to obtain the dynamic message, or to obtain the storage address or the network link of the dynamic message. After the dynamic-message information is obtained, the second program 300 may generate the notification of the dynamic message. After receiving the notification, the processor 100 may load the located dynamic message to the message display interface and display the dynamic message on the message display interface, when the message display interface of the first program 200 is at the active status.

The second program 300 may obtain the dynamic-message information by requesting the dynamic message form the server 400 or another electronic device, or by receiving the dynamic message pushed from the server 400 or the other electronic device. Locating the dynamic message by the processor 100 may be performed according to a network link for the dynamic message or a local storage directory contained in the notification.

Figure 7:
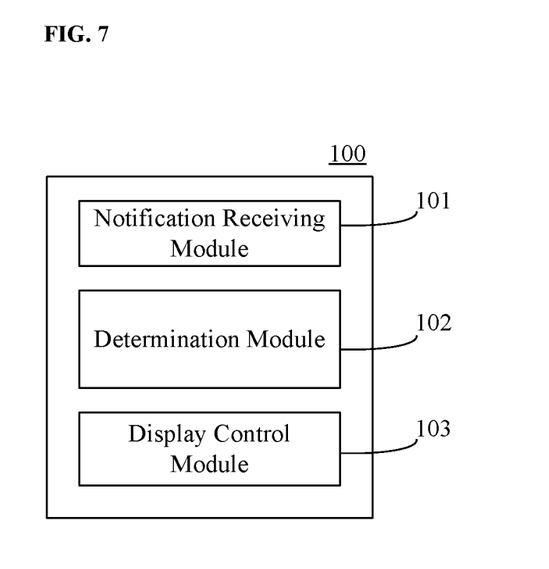
FIG. 7 illustrates a block diagram of an example of processor according to various disclosed embodiments of the present disclosure.

FIG. 7 illustrates a block diagram of an example of the processor 100 consistent with the disclosure. As shown in FIG. 7, the processor 100 includes a notification receiving module 101, a determination module 102, and a display control module 103.

In some embodiments, the notification receiving module 101 can receive a notification about a dynamic message sent from the second program 300. In some embodiments, the notification may directly include the dynamic message to be displayed. In some other embodiments, the notification may include only a storage address or a link address of the dynamic message.

The determination module 102 may detect the active status and the inactive status of the message display interface of the first program 200. In some embodiments, the determination module 102 may determine the active status and the inactive status of the message display interface based on a preset instruction. The preset instruction can be generated according to, for example, at least one of a preset action, a preset voice, or a preset touch object such as an icon, etc. A preset action for switching the message display interface to the active status or the inactive status may include, for example, a pre-stored gesture action, such as sliding down from a top of a display screen of the electronic device, sliding toward an opposing side from one side of the display screen of the electronic device, or sliding up from a bottom of the display screen of the electronic device. The preset voice may include, for example, a pre-stored voice that is configured in advance. The pre-stored voice not only can include a voice content, but also can include a voice print of the user who has generated the voice. When the voice content and the voice print are both matched, the status of the message display interface may be switched. Further, the preset touch object may include, for example, a preset shortcut key, a corresponding touch key, or the like.

In addition, switching between the active status and the inactive status of the display region assigned in the message display interface and for the dynamic message can be performed similarly according to the above-described preset instruction. Different preset instructions can be configured to switch the message display interface to the active status or to the inactive status, respectively. Different preset instructions can be configured to switch the display region assigned in the message display interface to the active status or to the inactive status, respectively. The determination module 102 may recognize the above-described preset instruction and determine whether the preset instruction is for switching to the active status or the inactive status of the message interface.

In some embodiments, the message display interface, e.g., a notification bar, of the first program of the electronic device may include one or more display regions for a plurality of dynamic messages. Further, the message display interface may be configured to include a slidable interface for viewing. That is, a sliding operation may be performed on the message display interface. Further, in some embodiments, when the sliding operation is performed, one or more display regions being displayed on a display screen of the electronic device may be at the active status, and one or more display regions not displayed on the display screen of the electronic device are at the inactive status. In some other embodiments, it may be determined that one or more display regions of the message display interface that are currently in a center portion of the display screen are at the active status, and one or more display regions of the message display interface that are currently not in the center portion of the display screen are at the inactive status. The determination module 102 may be further configured to determine whether one or more display regions assigned for displaying one or more dynamic messages are at the active status or the inactive status.

In addition, when the determination module 102 determines, i.e., detects, that the message display interface is at the active status or that the display region assigned on the message display interface for displaying the dynamic message is at the active status, the display control module 103 may display the dynamic message, corresponding to the notification received by the notification receiving module 101, on the message display interface or the assigned display region on the message display interface. Further, when the determination module 102 determines that the message display interface is switched from the active status to the inactive status or that the display region assigned on the message display interface for displaying the dynamic message is at the inactive status, the display of the dynamic message on the message display interface may be suspended. In the present disclosure, a message display on the message display interface may be controlled, and the display of the dynamic message can be adjusted according to a real-time user operation, thereby improving a user experience.

In some embodiments, when the determination module 102 determines that the message display interface is switched from the active status to the inactive status or that the display region assigned on the message display interface for displaying the dynamic message is at the active status, the display control module 103 may also store a playing progress of the dynamic message that is currently played. Further, when it is detected that the message display interface is switched from the inactive status back to the active status or that the display region assigned on the message display interface for displaying the dynamic message is switched from the inactive status to the active status, the display control module 103 may continue the display of the dynamic message on the message display interface or the display region assigned on the message display interface, based on the stored playing progress.

That is, in some embodiments, whether to continue playing the dynamic message may be chosen according to the playing progress at the time when the play of the dynamic message is suspended. The playing progress may include, for example, a percentage of played time or current playing time with respect to a total time duration of the dynamic message. When the message display interface is switched back to the active status, the display control module 103 may compare the playing progress with the preset progress stored therein, and may choose whether to continue the display of the dynamic message according to the comparison result.

The processor 100, the first program 200, or the second program 300 may assign a preset progress for the duration of a dynamic message, when playing time is used for representing a playing progress and preset time is used for representing a preset progress during the comparison. For example, the operation may be performed by the notification receiving module 101. The notification receiving module 101 may obtain the duration of the dynamic message based on the notification after receiving the notification about the dynamic message. Further, the notification receiving module 101 may assign a preset progress and an identification based on the duration, and may send the preset progress and the identification to the display control module 103 for storing thereon. Because a duration of one dynamic message may be different from a duration of another dynamic message, the individually assigned preset progresses for different dynamic messages can be more suitable. Accordingly, for a dynamic message having a relatively long duration, when the message display interface is displayed again, stopping the play of the dynamic message when a large portion still has not been played may be prevented. Further, for a dynamic message having a relatively short duration, when the message display interface is displayed again, continuing the play when the play of the dynamic message has been finished may be prevented. In addition, the preset progress may be configured, such that a ratio of the preset time of the preset progress to a total duration of the dynamic message may range from approximately 85% to approximately 95%. The preset time of the preset progress may refer to a preset duration of the preset progress. The ratio of the preset time of the preset progress to a total duration of the dynamic message may refer to a duration ratio of the preset duration of the preset progress to the total duration of the dynamic message, i.e., a preset duration ratio for the preset progress.

In some embodiments, when the playing time of the playing progress of the dynamic message does not reach the preset time of the preset progress, the display control module 103 may continue the display of the dynamic message according to the playing time of the dynamic message at the time of pausing. When the playing time of the playing progress reaches the preset time of the preset progress, the display control module 103 may stop the display of the dynamic message.

In the embodiments that the preset progress is represented by the percentage of the preset time, i.e., the percentage of the preset duration, to the total duration of the dynamic message, a duration ratio representing a current playing progress can be directly obtained at the time of pausing. The duration ratio may be compared with the preset progress. If the duration ratio of the playing progress at the time of pausing does not reach the preset duration ratio of the preset progress, i.e., the percentage of the preset duration, the display of the dynamic message may be continued. If the duration ratio of the playing progress at the time of pausing reaches the preset duration ratio of the preset progress, the display of the dynamic message may be stopped.

In some other embodiments, when receiving a notification about the dynamic message, the notification receiving module 101 may also obtain total-duration information of the dynamic message, i.e., information of a total duration of the dynamic message, and send the total-duration information and generated identification information to the display control module 103 to store thereon. The preset progress may be represented by the percentage of the preset time, i.e., the percentage of the preset duration, to the total duration of the dynamic message, and the playing progress may be represented by the percentage of the playing time to the total duration of the dynamic message. Accordingly, the display control module 103 may calculate a duration ratio of the current playing progress, according to the total duration of the dynamic message and the duration of the current playing progress at the time of pausing, and then compare the duration ratio of the playing progress, i.e., the current playing progress, with the preset progress. If the duration ratio of the playing progress at the time of pausing does not reach the preset duration ratio of the preset progress, the display control module 103 may continue the display of the dynamic message. If the duration ratio of the playing progress at the time of pausing reaches the preset duration ratio of the preset progress, the display control module 103 may stop the display of the dynamic message.

Further, in some embodiments, the notification receiving module 101 may analyze certain details of the dynamic message, i.e., dynamic-message details, when obtaining dynamic-message information. In some other embodiments, a server may directly provide dynamic-message details when sending information about the dynamic message, i.e., the dynamic-message information. The dynamic-message details may include, for example, a web page link, a duration, and a capacity size, and producer information of the dynamic message. After the display of the dynamic message is completed on the message display interface, the display control module 103 may load the dynamic-message details to a display region assigned to display the dynamic message, such that the user can obtain the dynamic-message details of the dynamic message.

Figure 8:
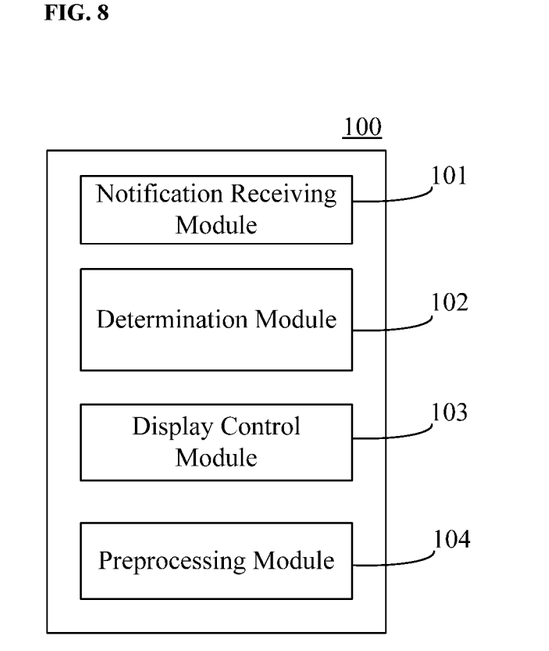
FIG. 8 illustrates a block diagram of another example of processor according to various disclosed embodiments of the present disclosure.

FIG. 8 illustrates a block diagram of another example of the processor 100 consistent with the disclosure.

As shown in FIG. 8, the processor 100 further includes a preprocessing module 104, in addition to the notification receiving module 101, the determination module 102, and the display control module 103. The preprocessing module 104 may perform a preprocessing operation on a dynamic message.

In some embodiments, when the first program obtains dynamic-message information, the preprocessing module 104 may perform a packaging operation on the dynamic message, and the display control module 103 may display the pre-processed dynamic message on the message display interface. The packaging operation may at least include packaging a touch interaction object and the dynamic message. The touch interaction object may include, for example, a touch key, a play/pause button, a close button, a total time duration, a display bar of a current playing progress, etc. When the display control module 103 displays the dynamic message, the packaged dynamic message may be displayed on the message display interface for viewing and operation by a user.

Further, the preprocessing module 104 may also perform noise reduction processing on the dynamic message to optimize the dynamic message.

Further, the first program 200 may also include a preprocessing module same as or similar to the above-described preprocessing module for completing a preprocessing operation on the dynamic message.

Figure 9:
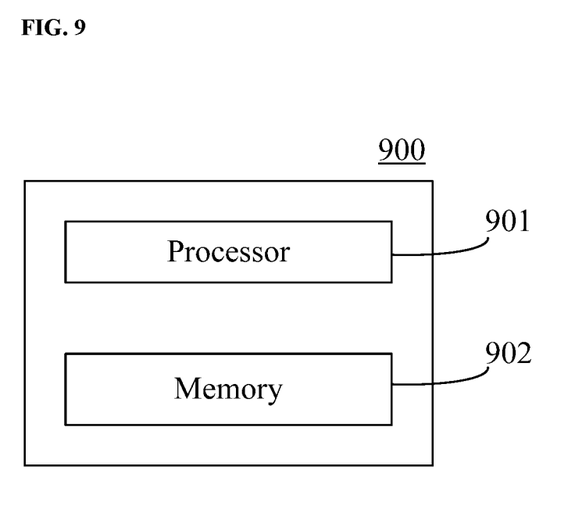
FIG. 9 illustrates a block diagram of another example of electronic device according to various disclosed embodiments of the present disclosure.

FIG. 9 illustrates a block diagram of another example of an electronic device 900 consistent with the disclosure. As shown in FIG. 9, the electronic device 900 includes a processor 901 and a memory 902. The memory 902 stores instructions for execution by the processor 901 to, for example, perform a method consistent with the disclosure, such as one of the methods described above.

In some embodiments, the processor 901 may be the processor 100 described above and may include, for example, a microprocessor. In some embodiments, the memory 902 may include, for example, a read only memory (ROM) or a random access memory (RAM).

In the electronic device of the present disclosure, a dynamic message may be loaded to a message display interface and displayed on the message display interface. Accordingly, the user can find and view the dynamic message to be displayed by entering the message display interface, without a need to access a certain directory to find the dynamic message. The operation may be simplified, and a convenient viewing may be provided, and a user experience may be improved.

For details of the electronic device to which the above-described data processing method is applied, reference can be made to the foregoing descriptions of product/device embodiments, which are not repeated here.

The present disclosure provides a display method and an electronic device for a dynamic message. The method may include obtaining, by a first program of an electronic device, a notification of a dynamic message from a second program of the electronic device; and displaying the dynamic message on a message display interface of the first program, when it is detected that the message display interface of the first program is switched from an inactive status to an active status. The present disclosure may provide a convenient viewing of a dynamic message and a convenient operation.

The foregoing description of the embodiments of the disclosure has been presented for purposes of illustration and description. It is not intended to be exhaustive or to limit the disclosure to the precise form or to embodiments disclosed. Accordingly, the foregoing description should be regarded as illustrative rather than restrictive. Obviously, many modifications and variations will be apparent to persons skilled in this art. The embodiments are chosen and described in order to explain the principles of the technology, with various modifications suitable to the particular use or implementation contemplated. It is intended that the scope of the invention be defined by the claims appended hereto in which all terms are meant in their broadest reasonable sense unless otherwise indicated. Therefore, the term "the disclosure," "the present disclosure," or the like does not necessarily limit the claim scope to a specific embodiment, and the reference to embodiments of the disclosure does not imply a limitation on the invention, and no such limitation is to be inferred. Moreover, the claims may refer to "first," "second," etc., followed by a noun or element. Such terms should be understood as a nomenclature and should not be construed as giving the limitation on the number of the elements modified by such nomenclature unless specific number has been given. Any advantages and benefits described may or may not apply to all embodiments of the disclosure. It should be appreciated that variations may be made to the embodiments described by persons skilled in the art without departing from the scope of the present disclosure. Moreover, no element or component in the present disclosure is intended to be dedicated to the public regardless of whether the element or component is explicitly recited in the following claims.

What is claimed is:

1. A method comprising:
   obtaining, by a first program of an electronic device, a notification associated with a video of a second program of the electronic device;
   in response to detecting that a message display interface of the first program for displaying the notification is switched from an inactive status to an active status, locating, by the first program, the video according to the notification and playing the video on the message display interface of the first program;
   in response to detecting that the message display interface is switched from the active status to the inactive status, suspending playing of the video and storing a playing progress of the video, the playing progress including a playing time that the video has been played before a suspending point at which the video is suspended; and
   in response to detecting that the message display interface is switched back from the inactive status to the active status after the playing of the video is suspended, determining whether to resume the playing of the paused video from the suspending point based on whether the playing time has reached a preset time of a preset progress, including:
      determining to resume the paused video from the suspending point in response to the playing time not reaching the preset time; and
      determining not to resume the paused video from the suspending point in response to the playing time reaching the preset time.

2. The method according to claim 1, wherein playing the video includes playing the video at a notification bar of the first program.

3. The method according to claim 1, further comprising:
   switching the message display interface from the inactive status to the active status in response to detecting a pre-stored gesture.

4. The method according to claim 3, wherein detecting the pre-stored gesture includes detecting at least one of sliding down from a top of a display screen of the electronic device, sliding toward an opposing side from one side of the display screen, or sliding up from a bottom of the display screen.

5. The method according to claim 1, further comprising:
   after the video is played, displaying dynamic-message detail information in the message display interface.

6. The method according to claim 1, wherein detecting that the message display interface is switched from the inactive status to the active status includes:
   determining that the video has been cached.

7. The method according to claim 6, further comprising, before playing the video on the message display interface:
   packaging the video with at least a touch interaction object to generate a packaged video; and
   loading the packaged video to the message display interface for playing.

8. The method according to claim 7, wherein the touch interaction object includes at least one of a play/pause button, a close button, a total duration, or a display bar of a current playing progress.

9. The method according to claim 1, further comprising:
   switching the message display interface from the inactive status to the active status in response to detecting a voice that has a voice content and a voice print matching a voice content and a voice print of a pre-stored voice.

10. An electronic device, comprising a processor managing a first program and a second program, wherein the processor:
    controls the first program to obtain a notification associated with a video of the second program;
    in response to detecting that a message display interface of the first program for displaying the notification is switched from an inactive status to an active status, controls the first program to locate the video according to the notification and play the video on the message display interface of the first program;
    in response to determining that the message display interface is switched from the active status to the inactive status, suspends playing of the video and stores a playing progress of the video, the playing progress including a playing time that the video has been played before a suspending point at which the video is suspended; and
    in response to determining that the message display interface is switched back from the inactive status to the active status after the playing of the video is suspended, determines whether to resume the playing of the video from the suspending point based on whether the playing time has reached a preset time of a preset progress, including:
       determining to resume the paused video from the suspending point in response to the playing time not reaching the preset time; and
       determining not to resume the paused video from the suspending point in response to the playing time reaching the preset time.

11. The electronic device according to claim 10, wherein the message display interface includes a notification bar of the first program.

12. The electronic device according to claim 10, wherein the processor further:
    switches the message display interface from the inactive status to the active status in response to detecting a pre-stored gesture.

13. The electronic device according to claim 12, wherein:
    the pre-stored gesture includes at least one of sliding down from a top of a display screen of the electronic device, sliding toward an opposing side from one side of the display screen, or sliding up from a bottom of the display screen.

14. The electronic device according to claim 10, wherein the processor further:

after the video is played, display dynamic-message detail information in the message display interface.

15. The electronic device according to claim 10, wherein the processor detects that the message display interface is switched from the inactive status to the active status by:
   determining that the video has been cached.

16. The electronic device according to claim 15, wherein the processor further:
   packages the video with at least a touch interaction object to generate a packaged video; and
   loads the packaged video to the message display interface for playing.

* * * * *